United States Patent Office 3,058,820
Patented Oct. 16, 1962

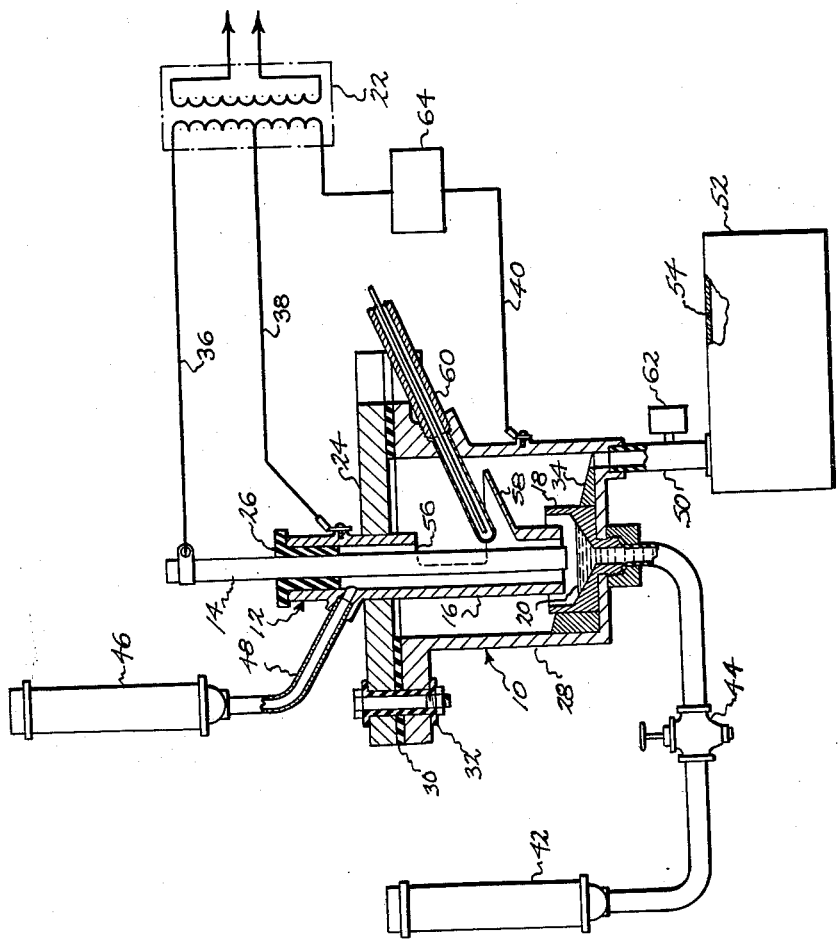

3,058,820
METHOD OF PRODUCING TITANIUM METAL
Bert W. Whitehurst, P.O. Box 113, North Hampton, N.H.
Filed July 25, 1958, Ser. No. 751,004
1 Claim. (Cl. 75—10)

The present invention relates to metallurgy and, more particularly, to metal reduction processes and devices useful therein.

The primary object of the present invention is to produce a pure or alloyed titanium, zirconium and/or hafnium product by reduction reaction under conditions that are controlled continuously with exceptional ease and precision by subjecting titanium, zirconium and/or hafnium halide or halides, while flowing in the liquid state, to an electric arc extending between a first electrode and a second electrode, the first electrode being composed of a liquid metal that participates in the reduction reaction, the second electrode being composed of a solid metal that may contribute to the composition of the product.

Other objects of the present invention in part will be obvious and in part will appear hereinafter.

The invention accordingly comprises the process involving the several steps and the relation and order of one or more of such steps with respect to each of the others, and the device possessing the construction, combination of elements and arrangement of parts, which are exemplified in the following detailed disclosure, and the scope of which will be indicated in the appended claim.

For a fuller understanding of the nature and objects of the present invention, reference should be had to the following detailed description, taken in connection with the accompanying drawing, which illustrates in cross-section, a device for performing a process in accordance with the present invention.

The process disclosed herein for producing a reduced metal composed of pure or alloyed titanium, zirconium and/or hafnium generally involves the simultaneous steps of: continuously flowing at least a halide of the metal in the liquid state into what may be termed a reaction region; continuously generating an electric arc in the reaction region between a first electrode, composed of a liquid metal that enters into an oxidation-reduction reaction with the metal halide, and a second electrode, composed of a solid metal that may dissolve in minor proportion in the reduced metal; and continuously flowing from the surface of the first electrode a slurry of the reduced metal in an unreacted proportion of the liquid metal halide.

Preferably, the starting metal halides are compounds of at least one metal selected from the class consisting of tetra-valent titanium, zirconium and hafnium and at least one halogen other than fluorine, e.g. chlorine, bromine, iodine. For example, titanium may be produced in accordance with the present invention from titanium tetra-chloride itself or intermixed with either or both of titanium trichloride and titanium dichloride. Within the reaction region, the temperature of the starting metal halide falls within a wide range, it being required merely that at the selected temperature the starting metal halide be liquid. The electric arc is generated by alternating current or direct current at a power level that is chosen for optimum efficiency in accordance with the dimensions of the system.

The liquid electrode is composed of a reducing metal having a melting point that is below the boiling point of the starting metal halide. The temperature of this reducing metal falls within a wide range, it being required merely that at the selected temperature, the reducing metal be liquid. Examples of suitable reducing metals are: a normally liquid metal such as mercury; an active alkali such as sodium, potassium or lithium; an alkaline earth metal such as calcium, strontium or barium; and a metal alloy such as lead and bismuth in equal proportions.

In view of the existence of a tendency of metal from the solid electrode to dissolve in the metal reduced in the presence of the electric arc, the nature of the solid electrode is in part responsible for the composition of the metal reduced hereunder. Specifically, if it is desired to produce pure titanium from titanium tetra-halide, the solid electrode should be composed of pure titanium. Likewise, in the production of pure zirconium and hafnium, the solid electrode should be composed, respectively, of zirconium and hafnium. On the other hand, the composition of the reduced metal will be altered by dissolution therein of another metal from the solid electrode.

An apparatus for effecting a process of the present invention is illustrated in the accompanying drawing as comprising a housing 10 that supports and at least partially encloses the operating components now to be described. These components include: a solid electrode 12 in the form of an inner rod 14 and an outer tube 16 through which liquid metal halide flows under gravity; a well 18 carrying a liquid electrode 20; and a source 22 of electrical energy for applying a voltage between solid electrode 12 and liquid electrode 20.

Electrode 12 extends through and is supported by the cover portion 24 of housing 10. Inner rod 14 is supported axially within outer tube 16 by an insulating fitting 26. Cover 24 is bolted to the container portion 28 of housing 10 but is insulated therefrom by a gasket 30 and a sleeve 32. Well 18 is supported on the base of container portion 28 in the midst of a sink 34. When the primary of electrical source 22 is suitably energized with alternating current, the secondary applies voltages between well 18 and outer tube 16 and between well 18 and inner rod 14. The secondary is connected from one extremity to inner rod 14 through a lead 36, from its medial tap to outer tube 16 through a lead 38 and from its other extremity to well 18 through a lead 40 and container portion 28. Inner rod 14, outer tube 16, container portion 28 and well 18 all are composed of metal.

In operation, starting metal halide is flowed from a supply 46 through an inlet 48 into the region between inner rod 14 and outer tube 16 and, thence, into the region between the lower extremity of solid electrode 12 and the upper surface of liquid electrode 20. Next, electrical source 22 is energized and the level of liquid electrode 20 is raised until appropriate current flow is indicated by an ammeter 64. This level is raised by flow from a reservoir 42 through a control valve 44. In the presence of the electric arc, a proportion of the halogen of the starting metal combines with the metal of liquid electrode 20 and titanium, zirconium and/or halfnium is reduced. The reduced metal may contain in solution a small proportion of metal from solid electrode 12. The reduced metal initially precipitates in unreacted starting metal halide to form a slurry in the reaction region between the lower extremity of solid electrode 12 and well 18. This slurry flows over the periphery of well 18 into sink 34 and through an outlet 50 into a collecting tank 52. Collecting tank 52 has a relief vent 54. Finally, the reduced metal is isolated from the slurry, for example, by volatilization of the starting metal halide.

It will be noted that outer tube 16 or solid electrode 12 is provided with an opening 56, from the lower edge of which extends an apron 58. Extending through container portion 28 of housing 10 is a cooling element 60 that serves to condense vapors formed in housing 10 and to direct them into the reaction region. A thermometer 62 and ammeter 64 serve to provide an indication of the reaction conditions at any moment.

The following non-limiting examples further illustrate the present invention.

*Example I*

In a preferred process involving the apparatus of the drawing, solid electrode 12 was composed of titanium, liquid electrode 20 was composed of mercury and the starting metal halide was $TiCl_4$. First, argon was admitted under pressure through inlet 48 in order to flush air from the system through vent 54. Next, the flow of $TiCl_4$ was initiated through inlet 48 and the primary of electrical source 22 was energized with alternating current. Next, control valve 44 was opened until ammeter 64 indicated the passage of current. Then, the flow of $TiCl_4$ was increased sufficiently to ensure a flow of the solids produced into collecting tank 52. The operating conditions of the system were as follows:

| | |
|---|---|
| Voltage between rod 14 and liquid electrode 20 | 67 volts A.C. |
| Voltage between tube 16 and liquid electrode 20 | 55 volts A.C. |
| Current in primary of electrical source 22 | 2.4 amps. |
| Current in secondary of electrical source 22 | 9.6 amps. |
| Temperature of $TiCl_4$ entering inlet 48 | 21°–22° C. |
| Flow of $TiCl_4$ into system | 30 grams per minute. |
| Temperature of liquid electrode 20 | 125°–135° C. |
| Temperature of slurry flowing through outlet 50 | 120°–130° C. |
| Operating pressure | Atmospheric. |
| Fineness of titanium produced | 40–110µ. |

After one hour, operation was discontinued. Approximately 200 g. of uncombined $TiCl_4$ was distilled from collecting tank 52. The total weight of solid products removed from collecting tank 52 was 4.42 kg. of which .39 kg. was Ti and 4.03 kg. was $HgCl_2$. The Hg was reclaimed from its chloride for reuse by conventional means.

*Example II*

The process of Example I was repeated except that $ZrCl_4$ was substituted for $TiCl_4$ under the following conditions:

| | |
|---|---|
| Temperature of $ZrCl_4$ entering inlet 48 °C | 325 |
| Temperature of liquid electrode 20 °C | 350 |
| Temperature of slurry flowing through outlet 50 °C | 300–350 |
| Operating pressure p.s.i. | 26 |
| Fineness of Zr produced | 60–110µ |

*Example III*

The process of Example I was repeated except that solid electrode 12 was composed of copper. The resulting reduced titanium metal contained by total weight approximately 2% of copper.

The present application is a continuation-in-part of Patent application Serial No. 545,756, filed on November 8, 1955, now abandoned, in the name of Bert W. Whitehurst, for Method for Producing Titanium, Zirconium or Hafnium Metals.

Since certain changes may be made in the above process and apparatus without departing from the scope of the invention herein involved, it is intended that all matter contained in the above description or shown in the accompanying drawing shall be interpreted in an illustrative and not in a limiting sense.

What is claimed is:

A method of producing titanium metal comprising the steps of continuously flowing liquid titanium tetrachloride (*a*) into contact with a first electrode composed of solid titanium in a reaction zone and between said first electrode and a second electrode, said second electrode composed of liquid mercury, and (*b*) into contact with an electric arc in said reaction zone, said arc being generated between said first and second electrodes, reacting said titanium tetrachloride in liquid state with mercury at a temperature below the boiling temperature of said titanium tetrachloride within said arc to produce solid titanium and thereby forming a slurry of liquid titanium tetrachloride and titanium metal product, and continuously flowing said slurry from said reaction zone.

References Cited in the file of this patent

UNITED STATES PATENTS

| | | |
|---|---|---|
| 2,607,674 | Winter | Aug. 19, 1952 |
| 2,647,826 | Jordan | Aug. 4, 1953 |
| 2,768,074 | Stauffer | Oct. 23, 1956 |
| 2,789,152 | Ham et al. | Apr. 16, 1957 |
| 2,854,392 | Tokumoto et al. | Sept. 30, 1958 |
| 2,938,783 | Ustan | May 31, 1960 |

FOREIGN PATENTS

| | | |
|---|---|---|
| 296,867 | Germany | Mar. 13, 1917 |
| 628,147 | Great Britain | Aug. 23, 1949 |

OTHER REFERENCES

Hopkins: Chapters in the Chemistry of the Less Familiar Elements, volume II, 1939; chapter 13, pages 4, 5 and 7.